United States Patent
Voss-Wolff et al.

(10) Patent No.: US 11,032,534 B1
(45) Date of Patent: Jun. 8, 2021

(54) PLANAR DEVIATION BASED IMAGE REPROJECTION

(71) Applicant: Microsoft Technology Licensing, LLC, Redmond, WA (US)

(72) Inventors: Christian Voss-Wolff, Sonnenbuhl (DE); Marc Schirski, Reutlingen (DE); Thomas Markus Keinz, Pfullingen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/796,640

(22) Filed: Feb. 20, 2020

(51) Int. Cl.
| | |
|---|---|
| *H04N 13/344* | (2018.01) |
| *G06K 9/32* | (2006.01) |
| *H04N 13/383* | (2018.01) |
| *G06T 7/70* | (2017.01) |
| *G06T 7/593* | (2017.01) |
| *G06T 17/20* | (2006.01) |
| *H04N 13/00* | (2018.01) |

(52) U.S. Cl.
CPC ......... *H04N 13/344* (2018.05); *G06K 9/3233* (2013.01); *G06T 7/593* (2017.01); *G06T 7/70* (2017.01); *G06T 17/20* (2013.01); *H04N 13/383* (2018.05); *H04N 2013/0081* (2013.01)

(58) Field of Classification Search
CPC ............... H04N 13/344; H04N 13/383; H04N 2013/0081; G06T 17/20; G06T 7/70; G06T 7/593; G06K 9/3233
See application file for complete search history.

(56) References Cited

U.S. PATENT DOCUMENTS

| | | | |
|---|---|---|---|
| 7,274,810 | B2 | 9/2007 | Reeves et al. |
| 10,403,032 | B2 | 9/2019 | Schmalstieg et al. |
| 10,445,922 | B2 | 10/2019 | Anderson et al. |
| 2015/0029218 | A1* | 1/2015 | Williams ............. G06T 19/006 345/633 |
| 2017/0115488 | A1* | 4/2017 | Ambrus ................. G06T 11/60 |
| 2017/0374343 | A1* | 12/2017 | Boulton ................ H04N 13/20 |
| 2018/0286112 | A1* | 10/2018 | Lauritzen ............... G06T 17/20 |
| 2019/0340812 | A1 | 11/2019 | Fuetterling et al. |

(Continued)

OTHER PUBLICATIONS

Khoury, et al., "Adaptive GPU Tessellation with Compute Shaders", Retrieved from: http://onrendering.com/data/papers/isubd/isubd.pdf, Oct. 1, 2018, pp. 1-14.

(Continued)

*Primary Examiner* — Francis Geroleo
(74) *Attorney, Agent, or Firm* — Alleman Hall Creasman & Tuttle LLP

(57) ABSTRACT

Example image reprojection methods are disclosed. In one example, a depth buffer of depth values corresponding to an image produced based on a predicted pose is divided into a plurality of tiles. For each tile of the plurality of tiles, a planar deviation error value that estimates a geometric complexity of the tile and penalizes the tile in proportion to an extent to which a geometry of the tile deviates from a plane is calculated. A tessellated mesh of the plurality of tiles is produced based on the planar deviation error values calculated for the plurality of tiles. An updated pose is received. The tessellated mesh is rendered based on the updated pose to output a reprojected image.

20 Claims, 8 Drawing Sheets

(56) References Cited

U.S. PATENT DOCUMENTS

2020/0202481 A1* 6/2020 Brigg .................. G06T 1/60

OTHER PUBLICATIONS

Nießner et al., "Real-time Rendering Techniques with Hardware Tessellation", In Computer Graphics forum, vol. 34, Feb. 2016, 25 Pages.

Pajak, et al., "Scalable Remote Rendering with Depth and Motion-flow Augmented Streaming", In Journal of Computer Graphics Forum, vol. 30, Issue 2, Apr. 28, 2011, 10 Pages.

* cited by examiner

PLANAR DEVIATION BASED IMAGE REPROJECTION

BACKGROUND

In augmented/mixed virtual reality computing systems, a common issue is latency between estimating a user's position for a given point in time and producing an image that aligns with the estimated position. Since producing an image for a given position requires an amount of processing time, there is a reasonable likelihood that the user will have moved away from the initial position for which the image was produced by the time the image becomes available for display. Such latency issues may result in misalignment of the displayed image relative to the user's actual position when the image is displayed, which is referred to as "pose error."

SUMMARY

Example image reprojection methods are disclosed. In one example, a depth buffer of depth values corresponding to an image produced based on a predicted pose is divided into a plurality of tiles. For each tile of the plurality of tiles, a planar deviation error value that estimates a geometric complexity of the tile and penalizes the tile in proportion to an extent to which a geometry of the tile deviates from a plane is calculated. A tessellated mesh of the plurality of tiles is produced based on the planar deviation error values calculated for the plurality of tiles. An updated pose is received. The tessellated mesh is rendered based on the updated pose to output a reprojected image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
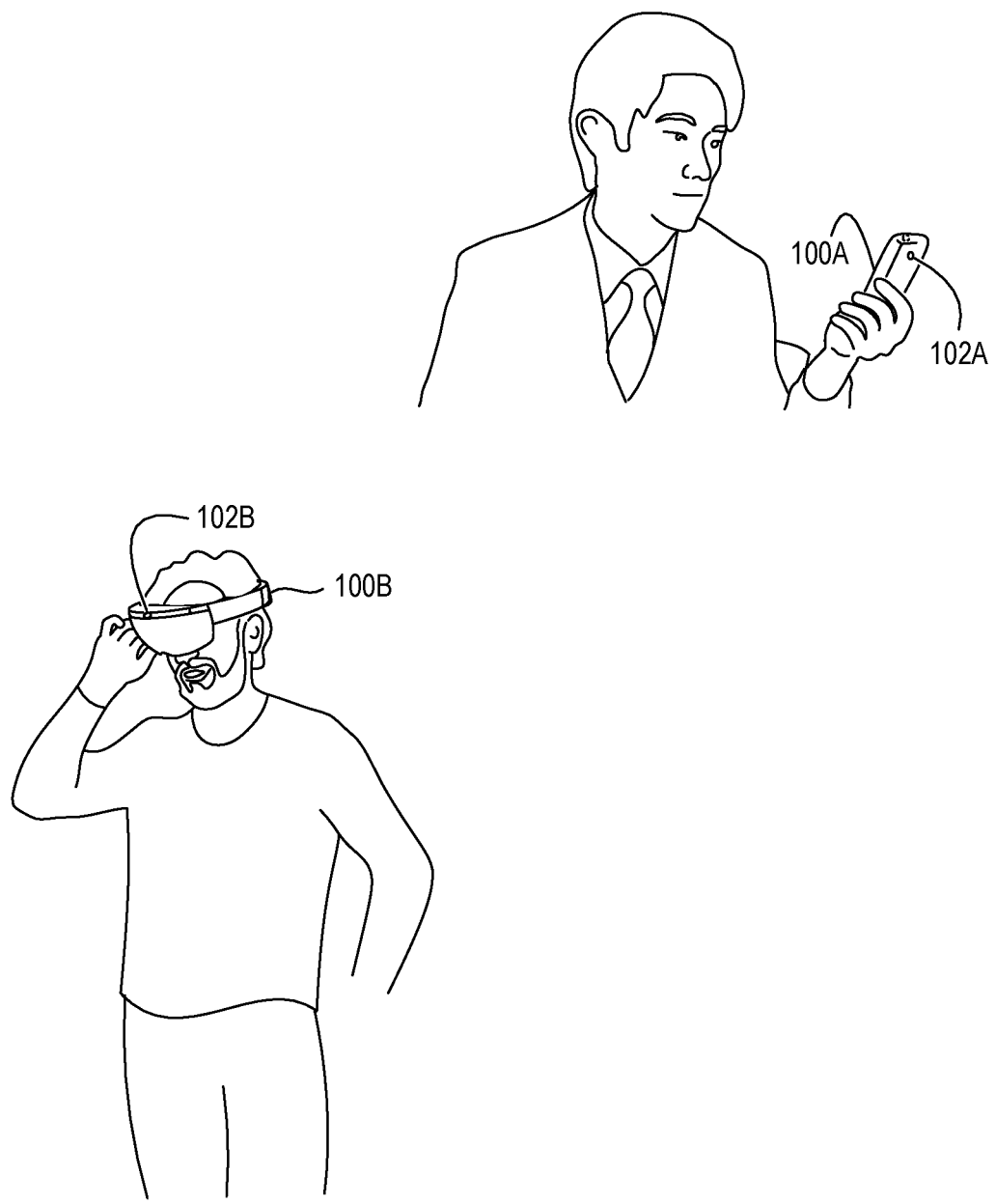
FIG. 1 shows example augmented/mixed virtual reality devices.

Remote rendering of imagery may be employed by some augmented/mixed virtual reality computing systems. In a remote rendering scenario, a remote computing system may render an image and send, via a network connection, the rendered virtual image to an augmented/mixed virtual reality computing system for display. For example, remote rendering may be employed in a scenario where the augmented/mixed virtual reality computing system has limited power and/or computer processing capabilities, such as with mobile computing devices. In this case, the lack of power and/or computer processing capabilities of the mobile computing device may be compensated for by the capabilities of the remote computing system.

In a remote rendering scenario, latency between when an image is rendered and when the image is displayed may result in potentially significant pose error. To avoid user discomfort caused by such pose error, the augmented/mixed virtual reality computing system may locally modify the rendered image produced for an erroneous predicted pose to more closely align with the actual pose of the augmented/mixed virtual reality computing system when the image is displayed. Such local modification may be referred to as "late-stage reprojection."

Existing reprojection techniques generally cannot produce high-quality reprojected images with the power/performance constraints of mobile computing devices, due to the high processing cost of applying per-pixel corrections. Therefore, existing techniques usually use a form of down-sampling of depth values in a depth buffer to reduce computational complexity, such that reprojection can be performed by a mobile computing device having limited power/performance capabilities. However, such down-sampling results in a reduction in quality of the reprojected images.

Accordingly, the present disclosure is directed to an approach for performing late-stage reprojection on rendered imagery in a resource-efficient manner while avoiding down-sampling of depth values in the depth buffer and otherwise maintaining a high level of quality. In particular, the reprojection approach may include determining a geometric complexity of each of a plurality of different tiles that collectively make up an image. Such geometric complexity may be estimated based on a planar deviation error value that penalizes a tile in proportion to an extent to which a geometry of the tile deviates from a plane. A tessellated mesh is produced based on the planar deviation error values calculated for the plurality of tiles. The tessellated mesh may have a variable density that corresponds to the localized geometric complexity of the different tiles, such that tiles having greater geometric complexity have more primitives (e.g., triangles, vertices) and tiles having lesser geometric complexity have fewer primitives. The tessellated mesh may be rendered based on an updated pose to output a reprojected image. Such a reprojection approach may enable a computing device having limited power/performance capabilities to produce high quality reprojected imagery.

FIG. 1 shows aspects of different example augmented/mixed virtual reality computing devices (100A and 100B) that may display late-stage reprojected imagery as part of an augmented/mixed virtual reality experience. Device 100A is a smartphone. Device 100B is a head-mounted, near-eye display device. Such computing devices may have limited power/performance capabilities that may such computing device from producing high-quality reprojected images using existing reprojection techniques. On the other hand, the example late-stage reprojection approaches disclosed herein may be used by these and other computing devices to produce high quality reprojected imagery.

Figure 2:
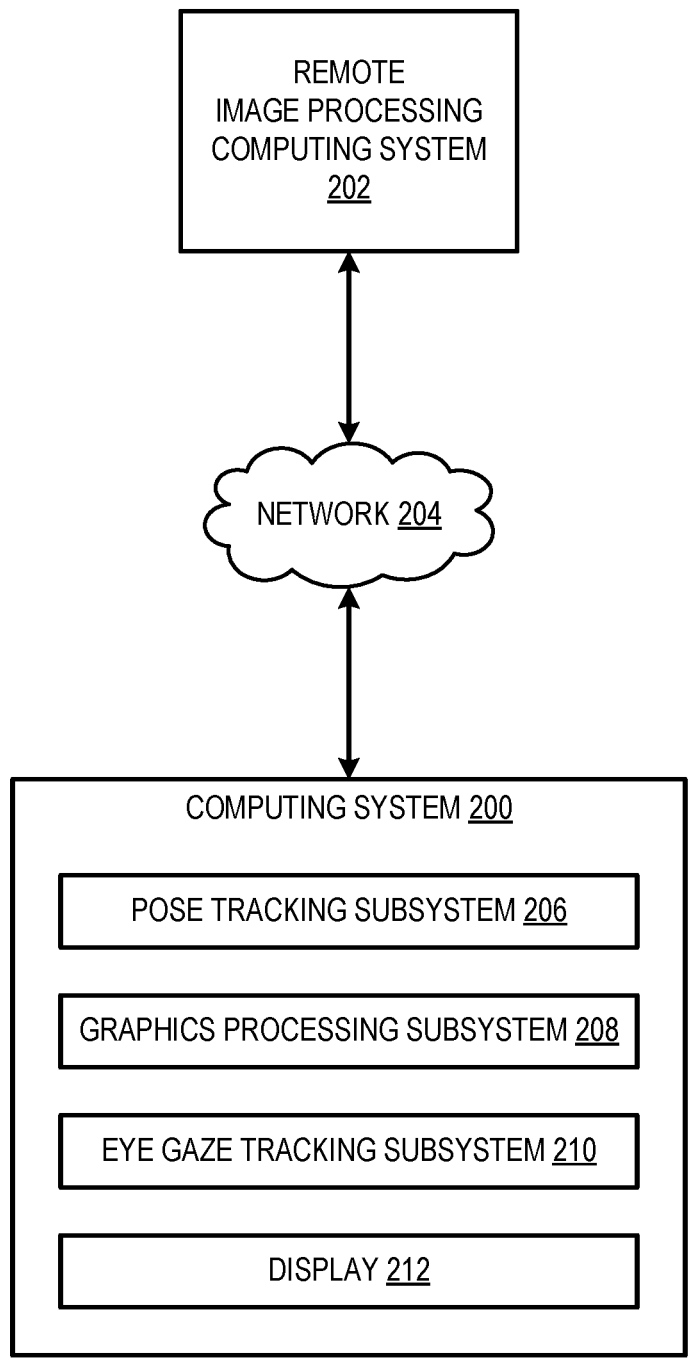
FIG. 2 schematically shows an example computing environment in which the augmented/mixed virtual reality devices of FIG. 1 may be enacted.

FIG. 2 shows an example computing system 200 in simplified form. For example, the computing system 200 may embody the computing devices 100A and 100B described above and illustrated in FIG. 1, or any other suitable computing system configured to perform the example late-stage reprojection approaches described herein. The computing system 200 is communicatively coupled to a remote image processing computing system 202 via a computer network 204, such as the Internet. The remote image processing computing system 202 is configured to perform remote image rendering for the computing system 200. As discussed above, in some examples, remote rendering may be employed in order to compensate for limited power/processing capabilities of the computing system 200.

The computing system 200 includes a pose tracking subsystem 206, a graphics processing subsystem 208, an eye gaze tracking subsystem 210, and a display 212. The pose tracking subsystem 206 is configured to determine a pose of the computing system 200 in physical space. In some examples, the pose tracking subsystem 206 may include one or more optical sensors, such as a color or monochrome camera, an infrared camera, and/or a camera sensitive to various other ranges of electromagnetic radiation, such as Ultra-Violet light, near infrared light, or other suitable frequencies. In some examples, the pose tracking subsystem 206 may include a pair of stereo cameras. The pose tracking subsystem 206 configured to determine a pose of the computing system 200 based on images acquired by the one or more optical sensors. In some examples, the pose tracking subsystem 206 configured to determine a pose of the computing system 200 using depth-based techniques, such as time-of-flight or structured light imaging techniques.

In some examples, the pose tracking subsystem 206 may include an inertial measurement unit (IMU), which may include accelerometers, gyroscopes, and/or a compass that can detect, for example, a 6-degree-of-freedom (6DOF) position and orientation of the computing system 200. In some examples, the pose tracking subsystem 206 may be configured to further refine the 6DOF output of the IMU using visual tracking to search for movement of identified visual features in a series of images captured by the optical sensor(s) to generate an estimate of the relative movement of the computing system 200 based upon the movement of these visual features within successive image frames captured by the optical sensor(s) over time.

The pose tracking subsystem 206 may be configured to track the pose of the computing system 200 in any suitable manner using any suitable type of sensors. The determined pose of the computing system 200 may take any suitable form. In some examples, the pose may include a 6DOF position of the computing system 200 in a world coordinate system. In other examples, the pose may include a relative position of the computing system 200 in relation to other feature identified in image(s) acquired by the pose tracking subsystem 206.

In some implementations, the remote image processing computing system 202 optionally may perform at least some pose tracking functionality on behalf of the computing system 200.

The computing system 200 is configured to send the pose determined by the pose tracking subsystem 206 to the remote image processing computing system 202 via the computer network 204. The remote image processing computing system 202 is configured to render an image based on the pose of the computing system 200. In some examples, the remote image processing computing system 202 may render the image based on the pose and additional prior pose(s) received from the computing system 200 that may inform an estimate of a change in pose of the computing system 200 over time. In some examples, the remote image processing computing system 202 may render a series of images based on the determined pose. In some examples, the remote image processing computing system 202 may render one or more image based on a predicted pose of the computing system 200 that is derived from the determined pose of the computing system 200.

The remote image processing computing system 202 is configured to send, via the computer network 204, the rendered image to the computing system 200 for display. In some examples, the remote image processing computing system 202 may be implemented as a cloud computing service that renders high-quality interactive content in the cloud and streams the rendered imagery to the computing system 200.

As discussed above, since the remote image processing computing system 202 and the computing system 200 are connected via the computer network 204, latency between when an image is rendered by the remote image processing computing system 202 and when the image is displayed by the computing system 200 may result in potentially significant pose error. As such, the graphics processing subsystem 208 is configured to perform late-stage reprojection operations to modify the rendered image locally on the computing system 200 to more closely align with the actual pose of the computing system 200 when the image is displayed via the display 212.

In some implementations, the computing system 200 optionally may include the eye gaze tracking subsystem 210. The eye gaze tracking subsystem 210 may include an eye tracking camera configured to detect a direction of gaze or location of focus of one or more eyes of a user. The eye tracking camera may be configured to determine a user's gaze in any suitable manner. For example, eye gaze tracking subsystem 210 may include one or more glint sources, such as infrared light sources, configured to cause a glint of light to reflect from one or more eyes of the user. The eye tracking camera may be configured to capture an image of one or more eyes of the user including the glint. Changes in the glints from the user's eyes as determined from image data gathered via the eye tracking camera may be used to determine a direction of eye gaze. Further, a location at which gaze lines projected from the user's eyes intersect the display 212 may be used to determine an object at which the user is gazing (either a virtual object presented on the display or a real-world object viewed through the display in examples where the display is at least partially see-through).

In some examples, the eye gaze tracking subsystem 210 may be configured to determine a region of interest in an image presented via the display 212 based on eye gaze information. For example, the region of interest may be determined based on a gaze location or a dwell location of the user. The region of interest may be any suitable size within the image. For example, the region may be a single pixel or group of pixels. The eye gaze tracking subsystem 210 may be configured to send the determined region of interest (and/or the eye gaze information) to the graphics processing subsystem 208 to inform the image reprojection process performed by the graphics processing subsystem 208.

In some implementations, eye gaze tracking subsystem 210 may be omitted from the computing system 200, such that the computing system 200 does not have eye gaze tracking functionality.

Figure 3:
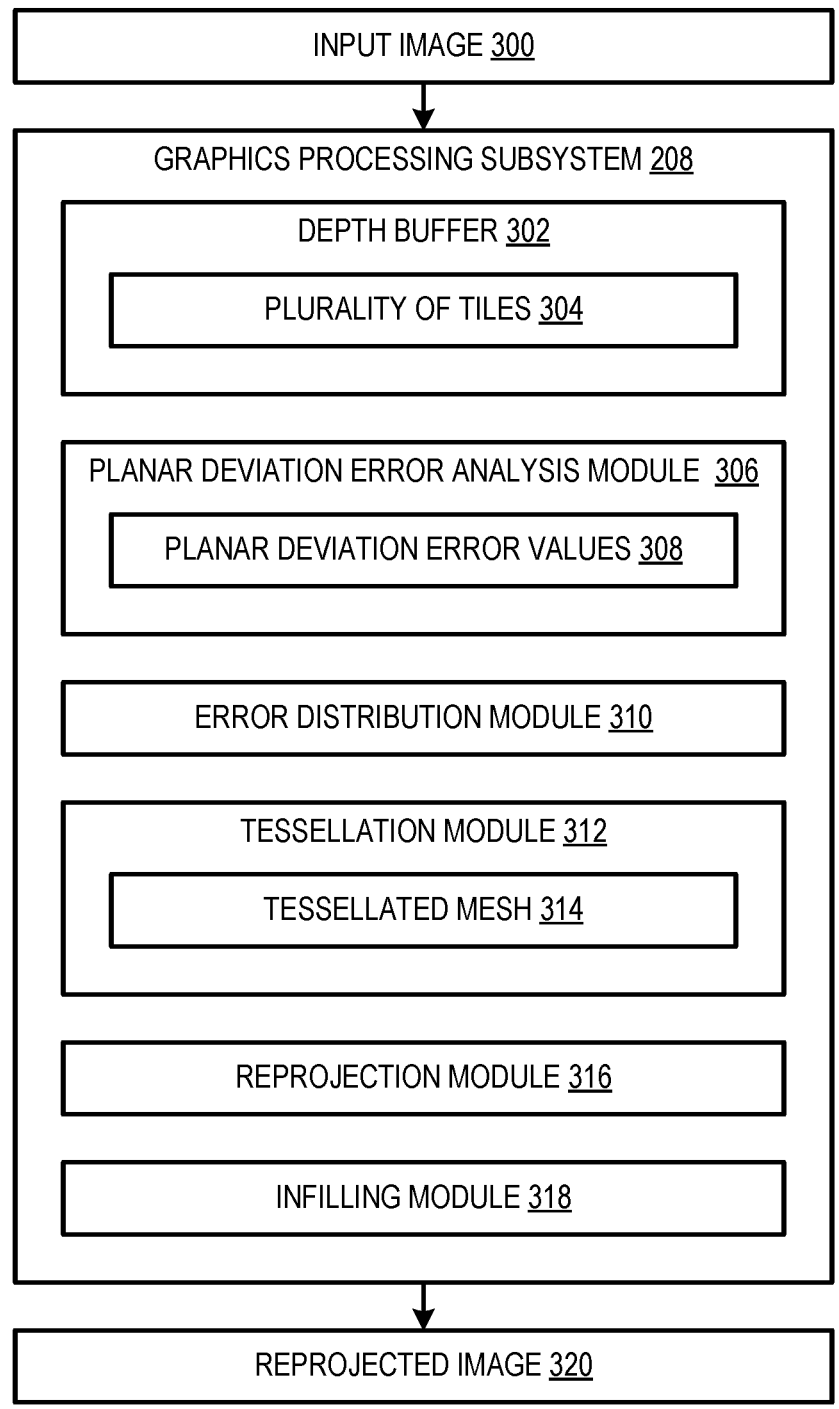
FIG. 3 schematically shows an example graphics processing subsystem that may be enacted by a computing system.

FIG. 3 shows different example modules of the graphics processing subsystem 208 shown in FIG. 2 that may be configured to perform different operations during the reprojection process to produce a reprojected image. The graphics processing subsystem 208 is configured to receive an input image 300 produced based on a predicted pose of the computing system 200. For example, the input image 300 may be remotely rendered by the remote image processing computing system 202 shown in FIG. 2. The graphics processing subsystem 208 includes a depth buffer 302, a planar deviation error analysis module 306, an error distribution module 310, a tessellation module 312, a reprojection module 316 and an infilling module 318. Note that the graphics processing subsystem 208 may include additional modules (not shown) that perform other operations related to image reprojection.

The depth buffer 302 is a data structure representing depth in the image. The depth buffer 302 may be configured to store a 2D-array that includes a depth value for each screen pixel of the input image 300. In some examples, the depth buffer 302 may have the same dimensions as a screen/frame buffer that stores pixel data for the image. The depth buffer 302 may be configured to store depth values in any suitable form. In some implementations, the depth buffer 302 may be a perspectively projected depth buffer comprising depth values (e.g., Z/W) that are non-linearly mapped between near and far planes that define a depth range in the image. In some examples, the depth buffer 302 may have a traditional convention in which the depth values increase in magnitude from the near plane to the far plane. In other examples, the depth buffer 302 may have a reverse convention in which the depth values increase in magnitude from the far plane to the near plane. In other implementations, the depth buffer 302 may comprise depth values that represent linear distance from the camera plane.

The planar deviation error analysis module 306 is configured to divide the depth buffer 302 of depth values corresponding to the input image 300 into a plurality of tiles 304. Each of the tiles may have a same fixed size. The planar deviation error analysis module 306 may be configured to divide the depth buffer 302 into any suitable number of tiles. As one example, the planar deviation error analysis module 306 may be configured to divide the depth buffer 302 into a plurality of 16×16-pixel tiles, arranged in a regular grid. In other examples, the tile size may be selected from anywhere between 8×8 pixels and 64×64 pixels. In some examples, the tile size can be selected flexibly depending on the type of content included in the reprojected image. For example, a smaller tile size may allow for a better fit to highly complex geometry, at the cost of a larger number of tiles, whereas a larger tile size may allow for covering more area cheaply for geometry of lower complexity.

The planar deviation error analysis module 306 divides the depth buffer 302 into the plurality of tiles 304, such that the planar deviation error analysis module 306 can perform local geometric complexity analysis on each of the tiles. In particular, the planar deviation error analysis module 306 is configured, for each tile of the plurality of tiles 304, to calculate a planar deviation error value 308 that estimates a geometric complexity of the tile and penalizes the tile in proportion to an extent to which a geometry of the tile deviates from a plane. Such planar deviation error analysis may leverage the fact that flat or approximately flat (i.e., planar) content is common in augmented/mixed virtual reality content. For example, such content may include user interfaces projected onto planar surfaces. Thus, such planar deviation error analysis allows for detecting a large number of the depth buffer tiles as flat or substantially flat, and correspondingly determining that such tiles have little or no planar deviation error (e.g., a complete flat or planar tile may have a planar deviation error of zero).

As discussed above, in some implementations, the graphics processing subsystem 208 may receive eye gaze information (e.g., a region of interest in the input image) from the eye gaze tracking subsystem 210 shown in FIG. 2. The planar deviation error analysis module 306 optionally may be configured to scale the planar deviation error values of the plurality of tiles based on a distance of the tile from the region of interest. For example, the planar deviation error values for tiles closer to the region of interest may be scaled up and the planar deviation error values for tiles further from the region of interest may be scaled down. Such scaling may be performed to leverage the fact that a human's peripheral vision has lower perceptive resolution relative to a central vision region. Thus, tiles that are located in peripheral regions of the user's field of view may be rendered with lower tessellation levels without sacrificing perceived visual quality.

The error distribution module 310 is configured to assign a budget or allotment of primitives (e.g., polygons, triangles, vertices) to each depth buffer tile based on the planar deviation error value 308 determined for the tile by the planar deviation error analysis module 306.

The tessellation module 312 is configured to produce a tessellated mesh 314 of the plurality of tiles 304 based on the allotment of primitives that is derived from the planar deviation error values 308 calculated for the plurality of tiles 304. In particular, each tile includes a primitive count approximately proportional to the planar deviation error value for the tile. The primitive count may be approximately proportional, because the primitive count may be rounded to a nearest integer value. By forming the tessellated mesh in this manner, computing resources may be allocated to a greater extent to tiles having greater geometric complexity and computing resources may be allocated to a lesser extent to tiles having lesser geometric complexity. The tessellation module 312 may include any suitable tessellation hardware unit configured to generate a tessellated mesh 314 of primitives (e.g., polygons, triangles, vertices) representing the depth values in the depth buffer 302.

The reprojection module 316 is configured to render the tessellated mesh 314 based on an updated pose of the computing system 200 to produce a reprojected image 320. For example, the reprojection module 316 may receive the updated pose from the pose tracking subsystem 206 shown in FIG. 2. In some examples, the reprojection module 316 may be configured to render the tessellated mesh 314 using rasterization to produce the reprojected image 320. In other examples, the reprojection module 316 may be configured to render the tessellated mesh 314 using raytracing to produce the reprojected image 320. The reprojection module 316 may be configured to sample the color input texture for each pixel and map the sampled color input textures to the new screen coordinates of the pixels in the reprojected image 320.

In some examples, when reprojecting an image from one pose to another pose, certain areas of the virtual world may become uncovered that were previously occluded by in the previous pose. As there is no color information available for these previously occluded regions in the input image 300, the infilling module 318 may be configured to reconstruct plausible color information to fill in such regions by performing inpainting or infilling. Accordingly, the infilling module 318 is configured to infill one or more areas in the reprojected image that were previously occluded based on the predicted pose and then uncovered based on the updated pose to produce an infilled reprojected image.

The graphics processing subsystem 208 may output the reprojected image 320. For example, the graphics processing subsystem 208 may output the reprojected image 320 to the display 212 for presentation to a user.

Note that although the resource-efficient reprojection approaches have been discussed in the context of scenarios that involve remote rendering, the resource-efficient reprojection approaches may be broadly applicable to other scenarios. For example, in some implementations, initial image rendering and image reprojection may be performed by the same computing system.

Figure 4:
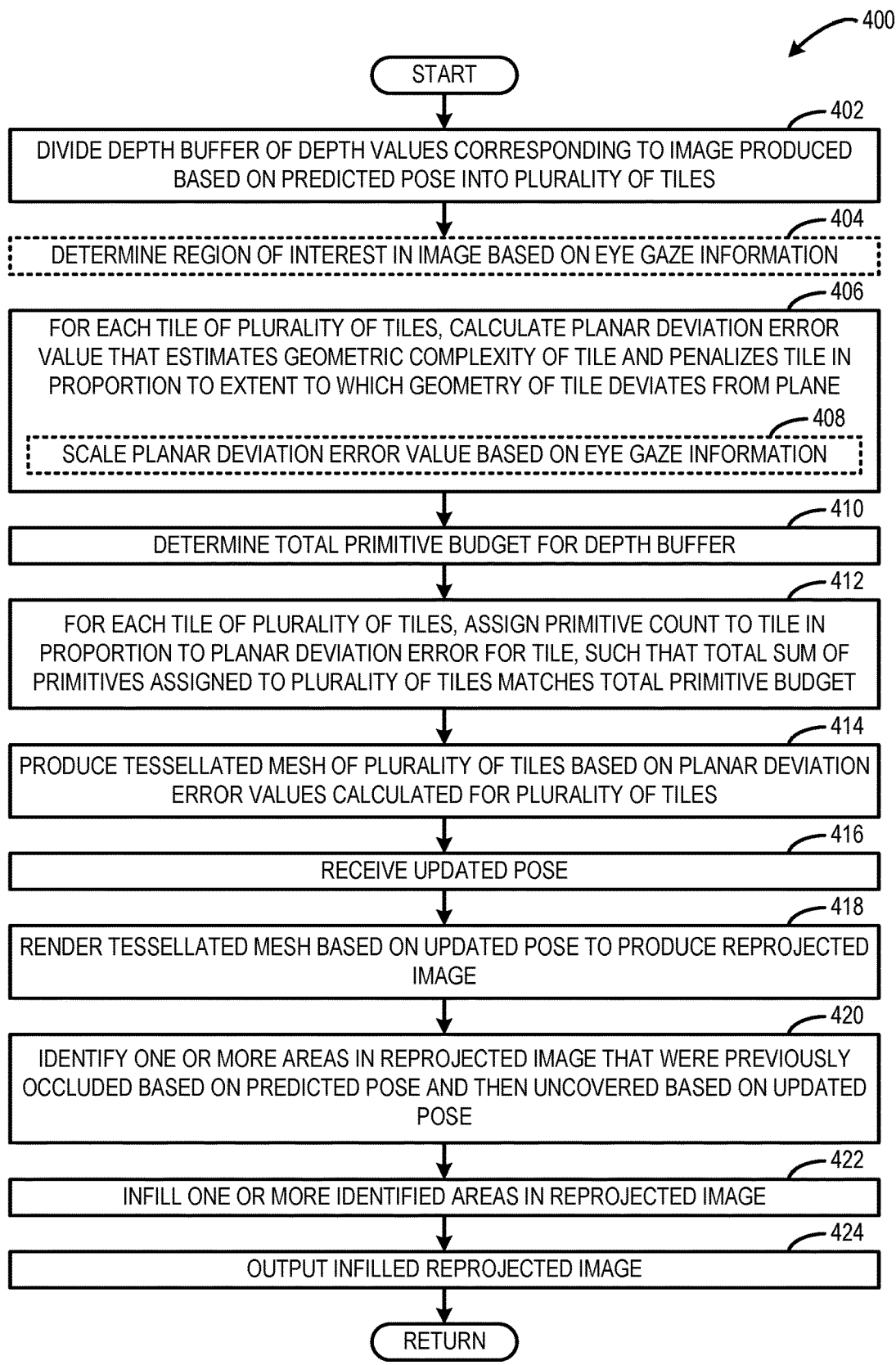
FIG. 4 is a flowchart of an example image reprojection method.

FIG. 4 is a flowchart of an example method 400 for performing late-stage image reprojection in a resource-efficient manner. For example, the method 400 may be performed by the graphics processing subsystem 208 shown in FIGS. 2 and 3.

Figure 5:
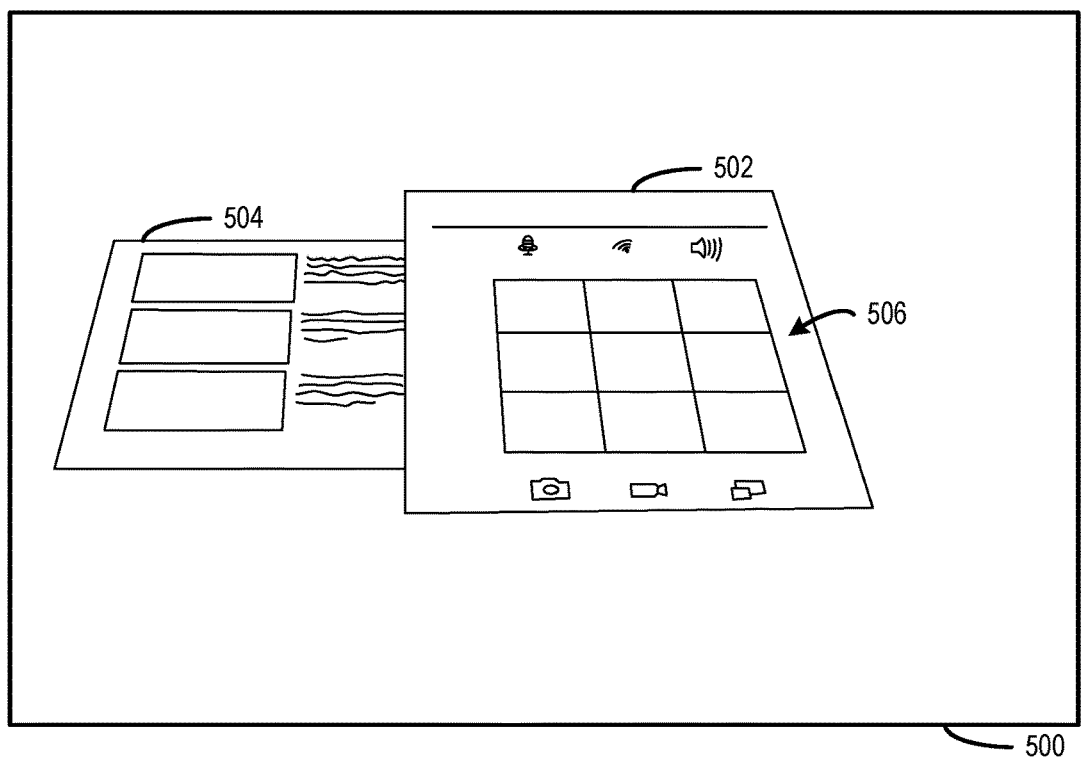
FIG. 5 shows an example input image to be reprojected.

FIG. 5 shows an example input image 500 that may be remotely rendered based on a predicted pose of the computing system. The input image 500 includes a first user interface panel 502 having a first depth and a second user interface panel 504 having a second depth that is greater than the first depth. In this case, the second panel 504 is partially occluded by the first panel 502. Each of the panels 502 and 504 are flat or planar. Further, the first panel 502 includes a plurality of menus 506 that protrude from the first panel 502, and each of the menus have planar surfaces.

Returning to FIG. 4, at 402, a depth buffer of depth values corresponding to an image produced based on a predicted pose is divided into a plurality of tiles. For example, the depth buffer may be divided into a plurality of tiles by the planar deviation error analysis module 306 of the graphics processing subsystem 208 shown in FIG. 3.

Figure 6:
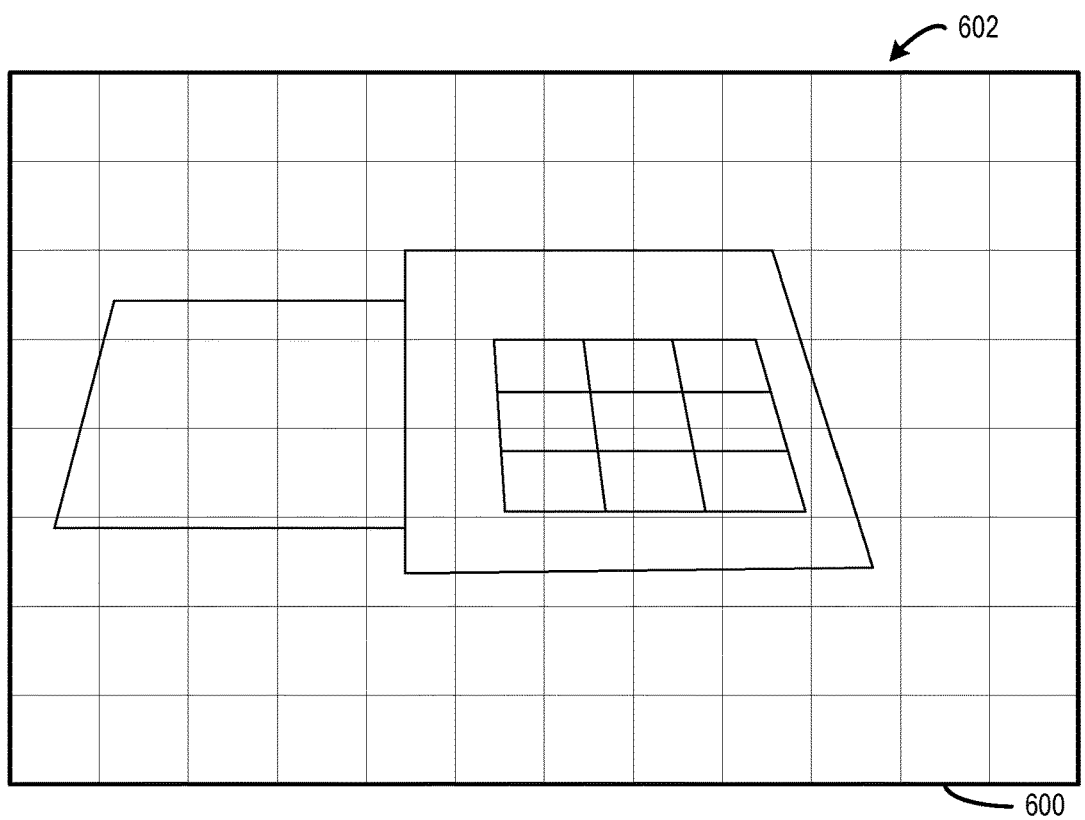
FIG. 6 shows an example visualization of a depth buffer corresponding to the input image shown in FIG. 5.

FIG. 6 shows an example visualization 600 of the depth buffer corresponding to the input image 500 shown in FIG. 5. The visualization 600 only includes depth data and does not include any pixel data of the image 500. As such, the first panel including the plurality of menus and the second panel are represented as flat surfaces corresponding to the associated depth values. Further, the depth buffer is shown is divided into a plurality of tiles 602. Each of the tile may be analyzed to determine local geometric complexity.

Returning to FIG. 4, in some implementations, at 404, a region of interest optionally may be determined based on eye gaze information. For example, the eye gaze information may be provided by the eye gaze tracking subsystem 210 shown in FIG. 2.

At 406, for each tile of the plurality of tiles, a planar deviation error value is calculated. The planar deviation error value may estimate a geometric complexity of the tile and penalize the tile in proportion to an extent to which a geometry of the tile deviates from a plane. A higher geometric complexity implies that different pixels in the tile require different amounts of positional correction, and thus a proportionally higher amount of processing resources/effort (e.g., additional reprojection operations) is to be allocated for reprojection of the tile. On the other hand, a lower geometric complexity implies that a proportionally lower amount of processing resources/effort is to be allocated for reprojection of the tile. In one example, the planar deviation error value may be specified as a root mean square error between sample values in the depth buffer tile and a least-square plane fitted to the same values. For a square tile of size T with coordinates centered around (x, y)=(0, 0), this error can be computed as:

$$E = \sqrt{\frac{1}{T^2}\sum_i z_i^2 - \frac{1}{T^4}\left(\sum_i z_i\right)^2 - \frac{12}{T^6 - T^4}\left(\left(\sum_i x_i * z_i\right)^2 + \left(\sum_i y_i * z_i\right)^2\right)}$$

According to this error metric, depth buffer regions that are covered by geometry which is perfectly flat in the virtual scene has a planar deviation error of zero. This is ensured by using perspectively projected depth values (e.g., Z/W), rather than a depth buffer that represents linear distance from the camera plane. With perspectively projected depth values, planar regions in the virtual world may be rasterized as depth values which depend linearly on their screen space coordinates, allowing a perfect planar fit for each depth buffer tile. Such a perfect-fit property is not provided by other complexity metrics, such as using the range (min-max) or standard deviation of the samples to calculate error.

Additionally, the above described planar deviation error metric may be flexibly applied to different types of images. In particular, the error metric is invariant to the projection matrix convention that was used to produce the image. In other words, the error metric provides the same result for both a conventional and reverse depth buffer, where the values of near and far plane are swapped. For example, the planar deviation error values may be calculated for the plurality of tiles by the planar deviation error analysis module 306 of the graphics processing subsystem 208 shown in FIG. 3.

In some implementations, at 408, the planar deviation error value of each of the tiles optionally may be scaled based on a distance of the tile from the region of interest determined based on the user's eye gaze. For example, the error estimate may be reduced in the peripheral regions of the user's visual field, and correspondingly lower tessellation levels can be applied without significantly sacrificing perceived visual quality of the reprojected image. For example, the planar deviation error values may be scaled based on the eye gaze information by the planar deviation error analysis module 306 of the graphics processing subsystem 208 shown in FIG. 3.

Figure 7:
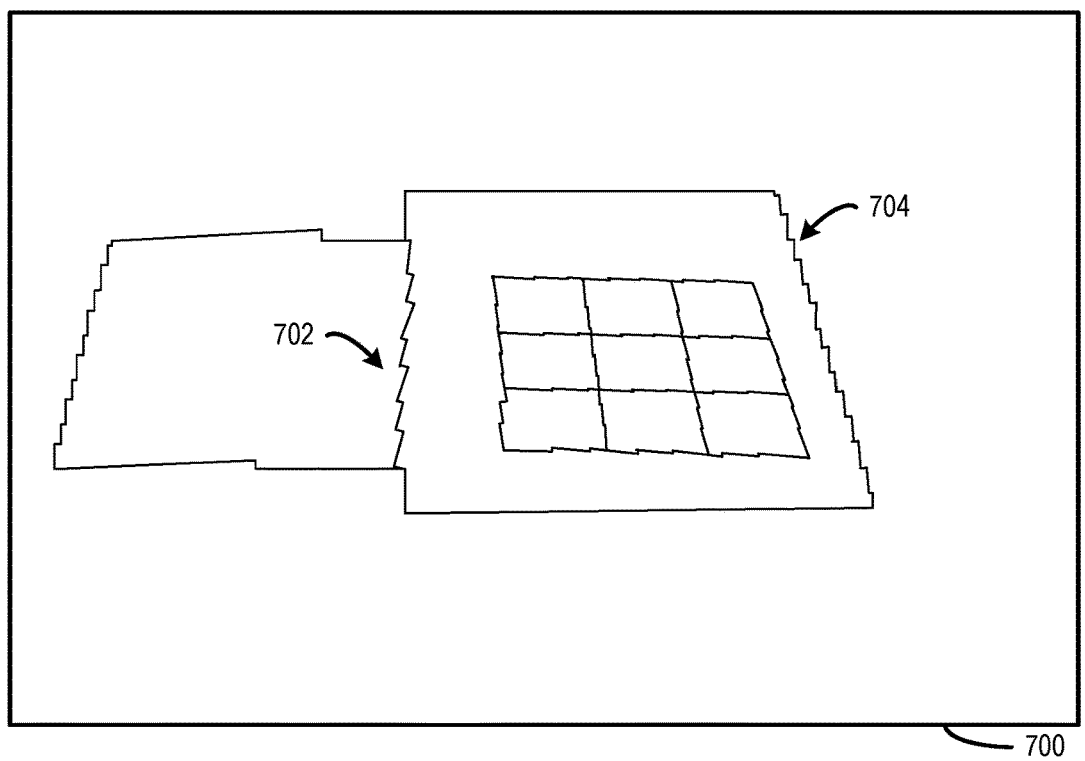
FIG. 7 shows an example visualization of a planar deviation error values produced from the depth buffer shown in FIG. 6.

FIG. 7 shows an example visualization 700 of planar deviation error values produced from the depth buffer shown in FIG. 6. Note that the edges 702 between objects and different objects (e.g., between the two user interface panels, between the menus and the user interface panels) and edges 704 between objects and the background are detected as having high error. On the other hand, the surfaces of the user interface panels and menus have zero error. According to this planar deviation error metric, allocation of the reprojection performance budget may be biased toward those tiles having geometric complexity where detailed per-pixel reprojection is required (e.g., tiles including edges) to achieve high quality. Correspondingly, less computing resources may be allocated toward tiles completely covered by flat surfaces.

Returning to FIG. 4, at 410, a total primitive budget is determined for allocation across the plurality of tiles. In some examples, the total primitive budget can be a predetermined value, ensuring deterministic performance cost independent of the input image. In other examples, the total primitive budget may be scaled based on a distance between the predicted pose used to initially render the image and the actual pose of the computing system when the image is displayed. Such scaling of the primitive budget may reduce performance costs for images that require little overall correction during reprojection. For example, the total primitive budget may be determined by the error distribution module 310 of the graphics processing subsystem 208 shown in FIG. 3.

At 412, for each tile of the plurality of tiles, a primitive count is assigned to the tile in proportion to the planar deviation error for the tile, such that a total sum of primitives assigned to the plurality of tiles matches the total primitive budget. The primitives may take any suitable form. For example, the primitives may include polygons (e.g., triangles) or vertices. In some examples, the type of primitive that is used may depend on the type of tessellation hardware unit employed by the computing system.

In one example where the primitives are triangles, each tile may have a minimum count of two triangles (corresponding to one quadrilateral per tile), and a maximum count of 2×T×T triangles for a tile size of T (corresponding to one quadrilateral per pixel). Additionally, the triangle count per tile must be naturally constrained to be integer values. In some implementations, the triangle distribution may include one or multiple passes. In each pass, each tile may be assigned a triangle count in proportion to the error value of the tile, and then the triangle count may be clamped and rounded to the nearest integer. This process may be repeated until the total sum of triangles assigned to all tiles matches the total triangle budget. For example, the primitive count may be assigned to the plurality of tiles by the error distribution module 310 of the graphics processing subsystem 208 shown in FIG. 3.

At 414, a tessellated mesh of the plurality of tiles is produced based on the planar deviation error values calculated for the plurality of tiles. More particularly, the tessellated mesh may be produced based on the primitive counts of the plurality of tiles that are derived from the planar deviation error values. The tessellated mesh may have a variable density of different numbers of primitive corresponding to different tiles. In this way, computing resources are allocated to a greater extent to tiles having greater geometric complexity and computing resources are allocated to a lesser extent to tiles having lesser geometric complexity. The tessellated mesh is effectively a sparse representation of the densely sampled depth buffer and represents the geometry that is to be reprojected in an efficient manner. For example, the tessellated mesh may be produced by the tessellation module 312 of the graphics processing subsystem 208 shown in FIG. 3.

Figure 8:
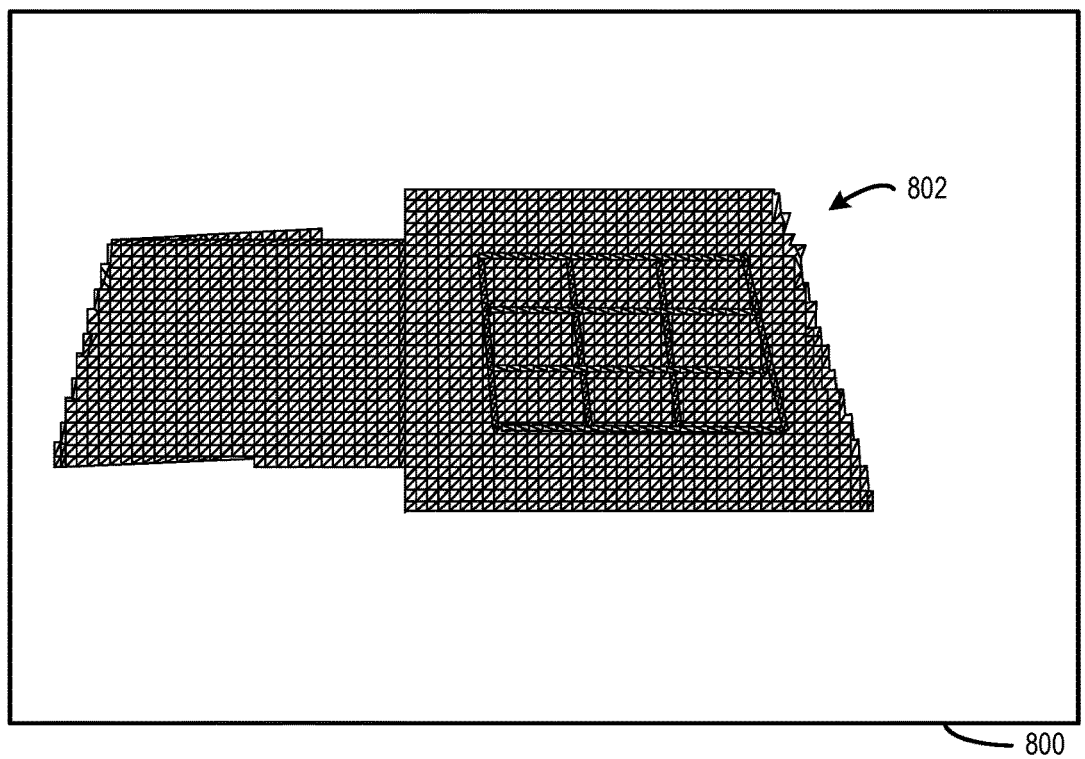
FIG. 8 shows an example visualization of a tessellated mesh produced based on the planar deviation error values of the example visualization shown in FIG. 7.

FIG. 8 shows an example visualization 800 of a tessellated mesh 802 produced based on the planar deviation error values of the visualization 700 shown in FIG. 7. The tessellated mesh 802 includes a mesh of triangles that represent the surfaces of the first panel including the plurality of menus and the second panel of the input image 500 shown in FIG. 5. In this example, the regions of the tessellated mesh 802 that include the edges of the panels and the menus may include a higher triangle count than other tiles that include flat surfaces.

Returning to FIG. 4, at 416, an updated pose of the computing system is received. For example, the updated pose may be received from the pose tracking subsystem 206 of the computing system 200 shown in FIG. 2. At 418, the tessellated mesh is rendered based on the updated pose to produce a reprojected image. For example, the tessellated mesh may be rendered to produce the reprojected image by the reprojection module 316 of the graphics processing subsystem 208 shown in FIG. 3.

At 420, one or more areas in the reprojected image that were previously occluded based on the predicted pose and then uncovered based on the updated pose are identified. In one example, each area is identified based on one or more primitives in the area being distorted by more than a threshold. In the triangle tessellated mesh example, the mesh does not have any holes, and instead triangles whose vertices lie on different sides of a discontinuity in the original depth buffer become heavily distorted as their vertices are projected to far-apart positions based on the updated pose. Such distortion and corresponding holes can be detected, in one example, from the Jacobian matrix of the reprojection that maps from a pair of source texel coordinates (u,v) to a pair of target pixel coordinates (x,y):

$$J = \begin{pmatrix} a & b \\ c & d \end{pmatrix} = \begin{pmatrix} \frac{\partial u}{\partial x} & \frac{\partial u}{\partial y} \\ \frac{\partial v}{\partial x} & \frac{\partial v}{\partial y} \end{pmatrix}$$

From the Jacobian matrix the singular values $\sigma_1$ and $\sigma_2$ can be computed as follows:

$$S_1 = a^2 + b^2 + c^2 + d^2$$
$$S_2 = \sqrt{(a^2 + b^2 - c^2 - d^2)^2 + 4(ac + bd)^2}$$
$$\sigma_{1,2} = \sqrt{\frac{S_1 \pm S_2}{2}}$$

The ratio $$\frac{\sigma_1}{\sigma_2}$$

represents the anisotropy of the reprojection, or in other words, the amount of distortion that each triangle experiences. By thresholding this distortion, for example limiting it to 2:1, the triangles can be classified as stemming from continuous and discontinuous regions of the source depth buffer. Correspondingly, areas of the reprojected image which are covered by highly anisotropic triangles can be identified as needing to be infilled, whereas areas of the reprojected image covered by non-distorted triangles do not need any post-processing infilling. For example, the one or more areas may be identified by the infilling module 318 of the graphics processing subsystem 208 shown in FIG. 3.

Figure 9:
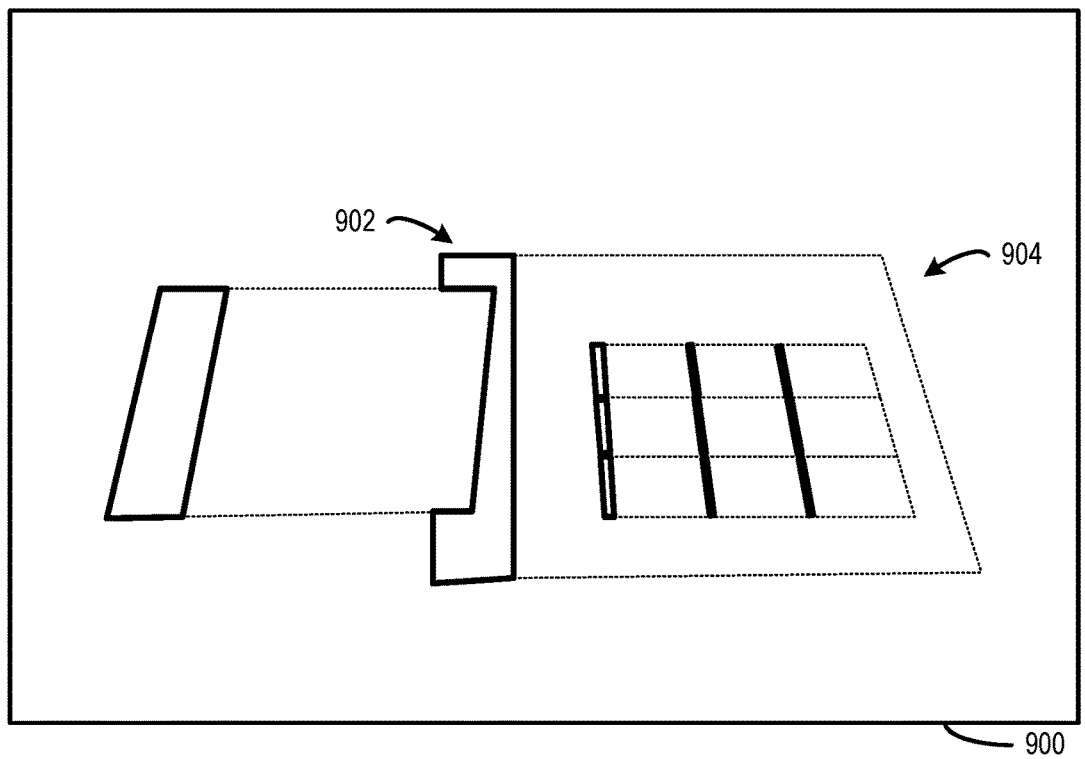
FIG. 9 shows an example visualization including an infill mask for a reprojected image produced from rendering the tessellated mesh shown in FIG. 8 based on an updated pose.

FIG. 9 shows an example visualization 900 including an infill mask 902 for a reprojected image 904 produced from rendering the tessellated mesh 802 shown in FIG. 8 based on an updated pose of the computing system. In the illustrated example, the panels and menus are shifted rightward based on a shift leftward of the pose of the computing system in the reprojected image 904 (shown in dotted lines). Such a shift causes previously occluded areas to be revealed. The infill mask 902 (shown in solid lines) identifies these areas that were previously occluded based on the predicted pose and then uncovered based on the updated pose. In one example, the infill mask 902 may identify areas of the tessellated mesh including triangles that are distorted with an anisotropy greater than 2:1.

Returning to FIG. 4, at 422, the one or more areas identified in the reprojected image may be infilled. In some implementations, each area of the one or more areas may be infilled with a color of a primitive in the area having a greatest depth value. Such an infilling technique may be performed to avoid bleeding of foreground color information into the background of the reprojected image as rendering artifacts may be perceived as less severe if they occur in the background, versus occurring in the foreground of an image. In the example of the triangle mesh, for triangles which exceed the distortion threshold, instead of interpolating the source color sample, a constant color taken from one of the three triangle vertices which is at the furthest distance from the camera may be applied instead in the infilling process. In some cases, such an infilling approach may produce artifacts in the form of perceivable lines. Accordingly, in some examples, infilling may include blurring the one or more areas that are infilled in the reprojected image. In one example, blurring may be performed by applying a Gaussian blur with an elliptical footprint of varying width, such that a blur kernel parameter σ increases linearly with the distance from the background pixels towards the foreground pixels. For example, the one or more areas may be infilled by the infilling module 318 of the graphics processing subsystem 208 shown in FIG. 3.

Note that in some examples, a reprojected image may not have any areas that were previously occluded. In such examples, infilling operations may be bypassed.

At 424, the infilled reprojected image may be output. For example, the infilled reprojected image may be output to the display 212 of the computing system 200 for presentation to a user.

Figure 10:
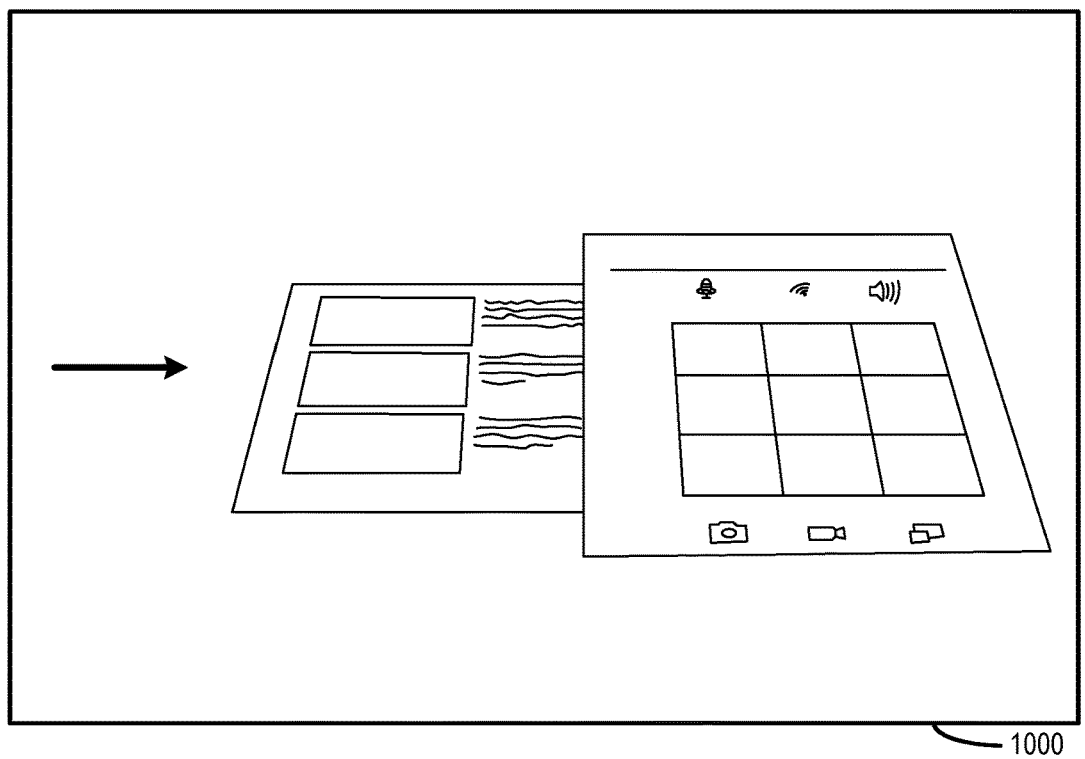
FIG. 10 shows an example reprojected and infilled image.

FIG. 10 shows an example image 1000 that is reprojected using the above described method. The image 1000 is produced for the actual position of the computing system at the time of display. In particular, the pose of the computing system is shifted leftward of the initial predicted position, and thus the reprojection is shifted rightward relative to the input image 500 shown in FIG. 5. The reprojected image 1000 may have minimal artifacts and avoids issues that would otherwise result from down-sampling of the depth buffer.

The above described method may be performed to carry out late-stage reprojection on rendered imagery in a processing resource-efficient manner while avoiding down-sampling of depth values in the depth buffer. Such a method may enable a computing device having limited power/performance capabilities to produce high quality reprojected imagery by dynamically distributing reprojection resources to geometrically complex regions of an image.

In some implementations, the methods and processes described herein may be tied to a computing system of one or more computing devices. In particular, such methods and processes may be implemented as a computer-application program or service, an application-programming interface (API), a library, and/or other computer-program product.

Figure 11:
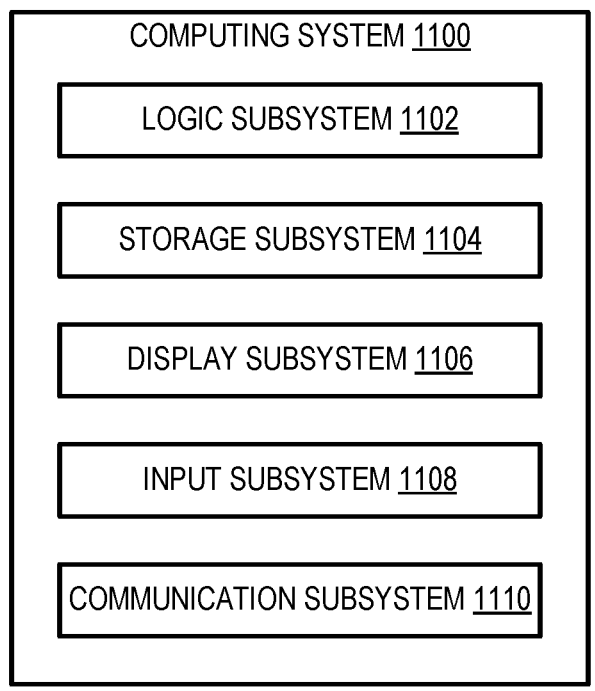
FIG. 11 schematically shows an example computing system.

FIG. 11 schematically shows a non-limiting implementation of a computing system 1100 that can enact one or more of the methods and processes described above. Computing system 1100 is shown in simplified form. Computing system 1100 may embody the computer devices 100A-100B described above and illustrated in FIG. 1 as well as the computing system 200 and the remote image processing computing system 202 described above and illustrated in FIG. 2. Computing system 1100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/mixed virtual reality devices.

Computing system 1100 includes a logic processor 1102, volatile memory 1104, and a non-volatile storage device 1106. Computing system 1100 may optionally include a display subsystem 1108, input subsystem 1110, communication subsystem 1112, and/or other components not shown in FIG. 11.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 may include physical devices that are removable and/or built-in. Non-volatile storage device 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 may include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 may include physical devices that include random access memory. Volatile memory 1104 is typically utilized by logic processor 1102 to temporarily store information during processing of software instructions.

It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 1100 typically implemented in software by a processor to perform a particular function using portions of volatile memory, which function involves transformative processing that specially configures the processor to perform the function. Thus, a module may be instantiated via logic processor 1102 executing instructions held by non-volatile storage device 1106, using portions of volatile memory 1104. It will be understood that different modules may be instantiated from the same application, service, code block, object, library, routine, API, function, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

In an example, an image reprojection method comprises dividing a depth buffer of depth values corresponding to an image produced based on a predicted pose into a plurality of tiles, for each tile of the plurality of tiles, calculating a planar deviation error value that estimates a geometric complexity of the tile and penalizes the tile in proportion to an extent to which a geometry of the tile deviates from a plane, producing a tessellated mesh of the plurality of tiles based on the planar deviation error values calculated for the plurality of tiles, receiving an updated pose, and rendering the tessellated mesh based on the updated pose to produce a reprojected image. In this example and/or other examples, the planar deviation error value may be calculated as a root mean square error between depth values in the tile and a least-square plane fitted to the depth values in the tile. In this example and/or other examples, the depth buffer may be a perspectively projected depth buffer comprising depth values that are non-linearly mapped between near and far planes. In this example and/or other examples, the method may further comprises determining a region of interest in the image based on eye gaze information; and the planar deviation error value may be scaled based on a distance of the tile from the region of interest. In this example and/or other examples, producing a tessellated mesh may include allocating computing resources to such production based on the planar deviation errors, such that computing resources are allocated to a greater extent to tiles having greater geometric complexity and computing resources are allocated to a lesser extent to tiles having lesser geometric complexity. In this example and/or other examples, the method may further comprises determining a total primitive budget for the depth buffer, and for each tile of the plurality of tiles, assigning a primitive count to the tile in proportion to the planar deviation error for the tile, such that a total sum of primitives assigned to the plurality of tiles matches the total primitive budget, and the tessellated mesh may be produced based on the primitive counts for the plurality of tiles. In this example and/or other examples, the total primitive budget may be a predetermined value. In this example and/or other examples, the total primitive budget may be scaled based on a distance between the predicted pose and the updated pose. In this example and/or other examples, the method may further comprise identifying one or more areas in the reprojected image that were previously occluded based on the predicted pose and then uncovered based on the updated pose, and infilling the one or more areas in the reprojected image to produce an infilled reprojected image. In this example and/or other examples, the one or more areas may be identified based on primitives in the one or more areas being distorted by more than a threshold. In this example and/or other examples, each area of the one or more areas may be infilled with a color of a primitive in the area having a greatest depth value.

In another example, a computing system comprises a logic subsystem, a storage subsystem holding instructions executable by the logic subsystem to divide a depth buffer of depth values corresponding to an image produced based on a predicted pose into a plurality of tiles, for each tile of the plurality of tiles, calculate a planar deviation error value that estimates a geometric complexity of the tile and penalizes the tile in proportion to an extent to which a geometry of the tile deviates from a plane, produce a tessellated mesh of the plurality of tiles based on the planar deviation error values calculated for the plurality of tiles, receive an updated pose, and render the tessellated mesh based on the updated pose to produce a reprojected image. In this example and/or other examples, the planar deviation error value may be calculated as a root mean square error between depth values in the tile and a least-square plane fitted to the depth values in the tile. In this example and/or other examples, the depth buffer may be a perspectively projected depth buffer comprising depth values that are non-linearly mapped between near and far planes. In this example and/or other examples, the storage subsystem may hold instructions executable by the logic subsystem to determine a total primitive budget for the depth buffer, and for each tile of the plurality of tiles, assign a primitive count to the tile in proportion to the planar deviation error for the tile, such that a total sum of primitives assigned to the plurality of tiles matches the total primitive budget, and the tessellated mesh may be produced based on the primitive counts for the plurality of tiles. In this example and/or other examples, the storage subsystem may hold instructions executable by the logic subsystem to identify one or more areas in the reprojected image that were previously occluded based on the predicted pose and then uncovered based on the updated pose, and infill the one or more areas in the reprojected image to produce an infilled reprojected image. In this example and/or other examples, the one or more areas may be identified based on primitives in the one or more areas being distorted by more than a threshold. In this example and/or other examples, each area of the one or more areas may be infilled with a color of a primitive in the area having a greatest depth value. In this example and/or other examples, the storage subsystem may hold instructions executable by the logic subsystem to determine a region of interest in the image based on eye gaze information, and the planar deviation error value may be scaled based on a distance of the tile from the region of interest.

In an example, an image reprojection method comprises dividing a depth buffer of depth values corresponding to an image produced based on a predicted pose into a plurality of tiles, for each tile of the plurality of tiles, calculating a planar deviation error value that estimates a geometric complexity of the tile and penalizes the tile in proportion to an extent to which a geometry of the tile deviates from a plane, producing a tessellated mesh of the plurality of tiles based on the planar deviation error values calculated for the plurality of tiles, receiving an updated pose, rendering the tessellated mesh based on the updated pose to produce a reprojected image, and infilling one or more areas in the reprojected image that were previously occluded based on the predicted pose and then uncovered based on the updated pose to produce an infilled reprojected image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An image reprojection method comprising:
   dividing a depth buffer of depth values corresponding to an image produced based on a predicted pose into a plurality of tiles;
   for each tile of the plurality of tiles, calculating a planar deviation error value that estimates a geometric complexity of the tile and penalizes the tile in proportion to an extent to which a geometry of the tile deviates from a plane;
   producing a tessellated mesh of the plurality of tiles based on the planar deviation error values calculated for the plurality of tiles;
   receiving an updated pose; and
   rendering the tessellated mesh based on the updated pose to produce a reprojected image.

2. The method of claim 1, where the planar deviation error value is calculated as a root mean square error between depth values in the tile and a least-square plane fitted to the depth values in the tile.

3. The method of claim 1, where the depth buffer is a perspectively projected depth buffer comprising depth values that are non-linearly mapped between near and far planes.

4. The method of claim 1, further comprising:
   determining a region of interest in the image based on eye gaze information; and where the planar deviation error value is scaled based on a distance of the tile from the region of interest.

5. The method of claim 1, where producing a tessellated mesh includes allocating computing resources to such production based on the planar deviation errors, such that computing resources are allocated to a greater extent to tiles having greater geometric complexity and computing resources are allocated to a lesser extent to tiles having lesser geometric complexity.

6. The method of claim 1, further comprising:
   determining a total primitive budget for the depth buffer; and
   for each tile of the plurality of tiles, assigning a primitive count to the tile in proportion to the planar deviation error for the tile, such that a total sum of primitives assigned to the plurality of tiles matches the total primitive budget, and where the tessellated mesh is produced based on the primitive counts for the plurality of tiles.

7. The method of claim 6, where the total primitive budget is a predetermined value.

8. The method of claim 6, where the total primitive budget is scaled based on a distance between the predicted pose and the updated pose.

9. The method of claim 1, further comprising:
   identifying one or more areas in the reprojected image that were previously occluded based on the predicted pose and then uncovered based on the updated pose; and
   infilling the one or more areas in the reprojected image to produce an infilled reprojected image.

10. The method of claim 9, where the one or more areas are identified based on primitives in the one or more areas being distorted by more than a threshold.

11. The method of claim 9, where each area of the one or more areas is infilled with a color of a primitive in the area having a greatest depth value.

12. A computing system, comprising:
a logic subsystem;
a storage subsystem holding instructions executable by the logic subsystem to:
divide a depth buffer of depth values corresponding to an image produced based on a predicted pose into a plurality of tiles;
for each tile of the plurality of tiles, calculate a planar deviation error value that estimates a geometric complexity of the tile and penalizes the tile in proportion to an extent to which a geometry of the tile deviates from a plane;
produce a tessellated mesh of the plurality of tiles based on the planar deviation error values calculated for the plurality of tiles;
receive an updated pose; and
render the tessellated mesh based on the updated pose to produce a reprojected image.

13. The computing system of claim 12, where the planar deviation error value is calculated as a root mean square error between depth values in the tile and a least-square plane fitted to the depth values in the tile.

14. The computing system of claim 12, where the depth buffer is a perspectively projected depth buffer comprising depth values that are non-linearly mapped between near and far planes.

15. The computing system of claim 12, where the storage subsystem holds instructions executable by the logic subsystem to determine a total primitive budget for the depth buffer, and for each tile of the plurality of tiles, assign a primitive count to the tile in proportion to the planar deviation error for the tile, such that a total sum of primitives assigned to the plurality of tiles matches the total primitive budget, and where the tessellated mesh is produced based on the primitive counts for the plurality of tiles.

16. The computing system of claim 12, where the storage subsystem holds instructions executable by the logic subsystem to identify one or more areas in the reprojected image that were previously occluded based on the predicted pose and then uncovered based on the updated pose, and infill the one or more areas in the reprojected image to produce an infilled reprojected image.

17. The computing system of claim 16, where the one or more areas are identified based on primitives in the one or more areas being distorted by more than a threshold.

18. The computing system of claim 16, where each area of the one or more areas is infilled with a color of a primitive in the area having a greatest depth value.

19. The computing system of claim 12, where the storage subsystem holds instructions executable by the logic subsystem to determine a region of interest in the image based on eye gaze information, and where the planar deviation error value is scaled based on a distance of the tile from the region of interest.

20. An image reprojection method comprising:
dividing a depth buffer of depth values corresponding to an image produced based on a predicted pose into a plurality of tiles;
for each tile of the plurality of tiles, calculating a planar deviation error value that estimates a geometric complexity of the tile and penalizes the tile in proportion to an extent to which a geometry of the tile deviates from a plane;
producing a tessellated mesh of the plurality of tiles based on the planar deviation error values calculated for the plurality of tiles;
receiving an updated pose;
rendering the tessellated mesh based on the updated pose to produce a reprojected image; and
infilling one or more areas in the reprojected image that were previously occluded based on the predicted pose and then uncovered based on the updated pose to produce an infilled reprojected image.

* * * * *